United States Patent [19]

LaRoche

[11] Patent Number: 5,258,071

[45] Date of Patent: Nov. 2, 1993

[54] VITREOUS FILLER MATERIAL FOR A POLYMERIC MATRIX

[75] Inventor: Pierre LaRoche, Nalinnes, Belgium

[73] Assignee: Glaverbel, Brussels, Belgium

[21] Appl. No.: 899,041

[22] Filed: Jun. 16, 1992

Related U.S. Application Data

[63] Continuation of Ser. No. 471,007, Jan. 25, 1990, which is a continuation of Ser. No. 194,289, May 16, 1988, abandoned.

[30] Foreign Application Priority Data

May 14, 1987 [LU] Luxembourg ............................ 86880

[51] Int. Cl.⁵ ................................................. C09C 1/36
[52] U.S. Cl. ...................................... 106/447; 106/454;
  106/447; 106/446; 106/490; 523/216; 523/217
[58] Field of Search ........................ 523/216; 428/406;
  106/447, 454, 289, 290

[56] References Cited

U.S. PATENT DOCUMENTS

| | | |
|---|---|---|
| 2,895,919 | 7/1954 | Gerhart . |
| 2,897,732 | 8/1959 | Shuger . |
| 3,110,614 | 11/1963 | de Vries ............................. 117/100 |
| 3,441,535 | 4/1969 | Beacham et al. ................... 523/217 |
| 3,492,149 | 1/1970 | Zisman et al. ...................... 117/75 |
| 3,492,150 | 1/1970 | Zisman et al. ...................... 117/75 |
| 3,519,594 | 7/1970 | Michaels . |
| 3,971,753 | 7/1976 | Frechtling et al. ................. 428/406 |
| 4,034,139 | 7/1977 | Mazarguil et al. ................. 428/406 |
| 4,111,893 | 9/1978 | Gasman et al. ...................... 260/40 |
| 4,214,914 | 7/1980 | Ivanchev et al. ................... 428/406 |
| 4,305,863 | 12/1981 | Adachi et al. ........................ 260/40 |
| 4,574,109 | 3/1986 | LaRoche .............................. 428/406 |
| 4,609,587 | 9/1986 | Grandana et al. .................. 428/325 |
| 4,713,295 | 12/1987 | Laroche ............................... 428/407 |
| 4,728,700 | 3/1988 | Patterson ............................. 523/217 |

FOREIGN PATENT DOCUMENTS

| | | |
|---|---|---|
| 47824 | 4/1974 | Australia . |
| 0701284 | 12/1967 | Belgium . |
| 701284 | 12/1967 | Belgium . |
| 835821 | 3/1970 | Canada . |
| 0003836 | 9/1979 | European Pat. Off. . |
| 0056771 | 7/1982 | European Pat. Off. . |
| 0093495 | 11/1983 | European Pat. Off. . |
| 2363012 | 7/1975 | Fed. Rep. of Germany . |
| 2836892 | 3/1980 | Fed. Rep. of Germany . |
| 3022300 | 12/1980 | Fed. Rep. of Germany . |
| 3041100 | 5/1981 | Fed. Rep. of Germany . |
| 3223010 | 12/1983 | Fed. Rep. of Germany . |
| 55-073524 | 11/1978 | Japan . |
| 140396 | 12/1978 | Japan ................................... 523/217 |
| 55-025400 | 2/1980 | Japan . |
| 57-096822 | 6/1982 | Japan . |
| 61-252216 | 11/1986 | Japan . |
| 1037873 | 8/1966 | United Kingdom . |
| 1067940 | 5/1967 | United Kingdom . |
| 1154055 | 6/1969 | United Kingdom . |
| 1183289 | 3/1970 | United Kingdom . |
| 1191688 | 5/1970 | United Kingdom . |
| 1284676 | 9/1972 | United Kingdom . |
| 1410085 | 10/1975 | United Kingdom . |
| 1436997 | 5/1976 | United Kingdom . |
| 1517910 | 7/1978 | United Kingdom . |
| 1520856 | 8/1978 | United Kingdom . |
| 2027042 | 2/1980 | United Kingdom . |
| 1577509 | 10/1980 | United Kingdom . |
| 2161489 | 1/1986 | United Kingdom . |
| 2175224 | 11/1986 | United Kingdom . |

OTHER PUBLICATIONS

Chemical Abstracts, vol. 102 (24), Abstract No. 204806b.
Chemical Abstracts, vol. 74, No. 14, 5 Apr. 1971, p. 38, resume No. 64948a, Columbus, Ohio.

*Primary Examiner*—John C. Bleutge
*Assistant Examiner*—Mark Sweet
*Attorney, Agent, or Firm*—Spencer, Frank & Schneider

[57] ABSTRACT

Vitreous filler material for incorporation into a polymerizable matrix, including a filler material which is vitreous; a polymerization catalyst; and a fixing agent which is applied to at least a part of the surface of the filler material and which affixes the polymerization catalyst to the surface of the filler material. Fixing catalyst to the surface of the filler material prior to its being contacted with the polymerizable matrix material facilitates good distribution of the catalyst within the polymerizable matrix material, and advantageously allows rapid catalytic action and a reduction in the amount of catalyst required.

11 Claims, No Drawings

VITREOUS FILLER MATERIAL FOR A POLYMERIC MATRIX

This application is a continuation of application Ser. No. 07/471,007, filed Jan. 25, 1990, which is a continuation of Ser. No. 07/194,289 filed May 16, 1988, both now abandoned.

BACKGROUND OF THE INVENTION

1. Field of the Invention

This invention relates to a method of forming a polymeric matrix containing inorganic filler material comprising bringing together filler material, polymerisable material and a catalyst to effect polymerisation of the polymerisable material and forming said polymeric matrix. The invention includes a filled polymeric matrix formed by the method of the invention, and it extends to vitreous filler material for incorporation into a polymeric matrix.

2. Description of the Related Art

Many polymerisable materials are known, and their use in more and more varied fields is widespread. One considerable advantage of such materials is that they can be used in the fluid or even viscoelastic state so that they may be shaped by moulding extrusion, injection or otherwise at a controlled temperature. Many polymerisable materials which are heat-formable at moderate temperatures or formable at ambient temperatures by such techniques require the presence of a polymerisation catalyst to initiate the chain reaction which gives a useful hardened formed article. In order that the polymerisation reaction can proceed properly to yield a homogeneous polymeric mass, it is of course necessary that the catalyst should be well distributed in the polymerisable material.

It is also well known to incorporate filler material into a polymeric matrix. This may be done in order to modify the mechanical, electrical or thermal properties of the polymer, or simply in order to reduce the cost of articles formed from the polymer. It is well known for example to incorporate glass fibres, whether individual glass fibres or glass fibre matting (which may be woven or unwoven), into a polymeric matrix. A filler material which is finding increasing use is vitreous beads. The expression 'vitreous' is used herein to denote glass and vitrocrystalline material which latter is a material produced by heat-treating a glass to introduce a crystalline phase therein. The use of hollow glass beads as filler in particular allows the manufacture of articles of low densities.

Difficulties are encountered in achieving a good distribution of filler and catalyst in the polymerisable material for the formation of a high quality polymeric matrix, especially when the polymerisation reaction is one which proceeds rather rapidly. As an example of the difficulties may be cited the case of painted road markings which incorporate glass bead filler material to render the paint retro-reflective so that the marking may be seen more easily at night. One known technique is illustrated in U.S. Pat. No. 2,897,732 and consists in spreading a paint which is polymerisable to form a polyestervinylidene copolymer, spraying a powder polymerisation catalyst onto the surface of the paint marking and then sprinkling glass beads over the paint so that at least some of them can sink into the marking before polymerisation is completed. This technique suffers from a number of disadvantages. Firstly, it requires a rather complicated apparatus having three separate material discharge heads. Secondly, the catalyst, which is the most expensive ingredient, can easily be blown away during discharge and wasted. Thirdly, the catalyst is essentially deposited on the surface of the paint marking, and this gives rise to differential polymerisation of the paint leading to cracking of the surface and a lack of catalyst in the depth of the paint. Fourthly, although rapid polymerisation of the paint is obviously desirable, the more rapidly such polymerisation takes place, the less easy it is to achieve the desired distribution of filler beads through the depth of the paint marking.

SUMMARY OF THE INVENTION

It is an object of this invention to provide a method of forming a polymeric matrix containing filler material in which a good distribution of catalyst within the polymerisable material is facilitated, which allows a rapid catalytic action, and which allows a proportional reduction in the amount of catalyst required for effecting complete polymerisation of the polymerisable material to form the polymeric matrix.

According to the invention, there is provided a method of forming a polymeric matrix containing inorganic filler material comprising bringing together filler material, polymerisable material and a catalyst to effect polymerisation of the polymerisable material and form said polymeric matrix, characterised in that a catalyst is fixed to the surface of the filler material prior to its contact with the polymerisable material.

Such a method is very simple to perform. In comparison with mixing a catalyst and a polymerisable material, it is generally much easier to ensure that a filler material and a polymerisable material have a desired relative distribution. Since, according to the invention, the catalyst is fixed to the filler, a good relative distribution of the polymerisable material and the filler ensures a good distribution of the catalyst and the polymerisable material. As a result, the catalysed polymerisation can take place rapidly, efficiently and evenly through the polymerisable material/polymer matrix. Also, the amount of catalyst applied to the filler can easily be regulated so that the amount of catalyst wasted is very much reduced. It has been observed that it is sometimes possible to use less catalyst in the technique of this invention than when using filler and catalyst separately. It is rather surprising that the technique of the invention should give a more efficient catalytic action since it would be expected that the efficiency would be reduced by fixing the catalyst to a material other than that which is to be catalysed.

Advantageously, said catalyst is adsorbed in a layer of fixing agent adherent to the surface of the filler material. This allows the catalyst to be fixed to the filler in such a way that the filler can be stored and handled before contact with a polymerisable material without loss of the catalyst and without reducing the reactivity of the catalyst in relation to the polymerisable matrix material which is to be polymerised.

It has been found that a number of materials are capable of forming a firm chemical bond with the range of filler materials commonly used for filling polymeric matrices and can be used as fixing agent for the catalyst. It is preferred that an organo-metallic compound is caused to adhere to said filler material to act as fixing agent. Many such compounds can easily be caused to bond chemically to the inorganic filler materials, in a monomolecular or multimolecular layer, and they are capable of fixing catalyst to the filler. It is especially preferred that said organo-metallic compound is selected from the group consisting of: silanes, chromium complexes, titanium derivatives and polymers having a methoxysilyl group. Such compounds are especially effective as fixing agents and they also have the advantage that they can promote coupling between the filler material and many common polymeric materials, such as polyesters and polyacrylates. This promotes the production of composite materials having a high breaking strength under flexure. It also promotes a high resistance to stripping out of the filler material by abrasion which is especially important where the polymeric matrix is to be used as a road marking.

As examples of such materials may be mentioned the following: vinylsilanes (A151 from Union Carbide), methacryloxysilanes (A174 from Union Carbide), styrylsilanes, chromium complexes of the Werner type including complexes with fumaric acid (Volans* from du Pont), isopropyl titanates (TSM2-7, TSA2-11, TTM33, TTAC-39 from Kenrich), and special polymers with methoxysilyl groups (Polyvest 25* from Hüls). ≠(* Trademark)

A coating of fixing agent may be applied to the filler material by various techniques such as immersion or other contact with a liquid reagent followed by drying, or by deposition from a vaporised reagent, for example, in the case of a particulate filler, in a fluidised bed. The formation of such a coating can be followed by impregnation of the coating with the catalyst, by contacting the coating with a liquid or dissolved catalyst. In some preferred embodiments of the invention, said filler material is contacted with a solution containing said catalyst and a fixing agent in order to fix said catalyst to the surface of the filler material, and the filler material is then dried. In this way, the fixing agent and catalyst are applied to the filler material in a single step, so the method is very simple and quick. In other preferred embodiments of the invention, said filler material is contacted with a suspension containing said catalyst and a fixing agent in order to fix said catalyst to the surface of the filler material. This is even simpler and quicker, since the drying step can sometimes thereby be eliminated. For example a silane fixing agent may be mixed with INTEROX BP-40-S (Trademark) from Peroxid-Chemie GmbH of Munich, which is a 40% suspension in phthalate of dibenzoyl peroxide as catalyst.

Embodiments of the invention wherein said filler material is mixed with an unsaturated polyester to effect polymerisation thereof are preferred. The invention may be used for the production of articles of such materials, for example acrylic or urethane/acrylic resins, in the presence of a catalyst at ambient temperature, using an accelerator if desired. This method may be used for manufacturing articles from a unsaturated polyester dissolved in a copolymerisable monomer, for example oligourethane methacrylic resins in methyl methacrylate as solvent monomer, or polyester resins mixed with a vinyl, acrylic or allyl monomer.

There are various polymerisation catalysts which make it possible to harden polymerisable materials more quickly and/or at lower temperatures. The use of a peroxide as catalyst is often recommended especially for unsaturated polyester resins and copolymers thereof. The invention includes a method wherein a peroxide, for example benzoyl peroxide which is available as a powder which is easy to handle, is fixed to the surface of the filler material as said catalyst.

Various fillers commonly used for forming filled polymeric matrices may be used in the method of the invention. Among such fillers may be mentioned natural minerals such as mica and talc. In the most preferred embodiments of the invention, however, said filler material comprises vitreous material. The use of vitreous material has a number of advantages, in particular vitreous filler materials are inexpensive and widely available, and such material can also be made in a variety of shapes and sizes for conferring particularly desirable properties on the product of the method.

In some preferred embodiments of the invention, said filler material comprises glass fibres. Such fibres may be short individual fibres, or they may be long fibres constituting woven or non-woven matting.

In most preferred embodiments of the invention, said filler material comprises vitreous beads. Vitreous beads are particularly useful because their very high degree of spherical symmetry allows especially easy mixing into a fluid or viscoelastic polymerisable material so that the beads, and thus also the catalyst, are well distributed therein, and their use gives good flow properties in any moulding operation and allows a uniform distribution of stresses within the formed polymeric matrix.

If it is desired to manufacture an article of low density, then hollow vitreous beads may be used. However, if it is envisaged that good mechanical resistance in the product will be more important than low density, it is preferred that said vitreous beads comprise solid vitreous beads. For the best mechanical properties in the product it may be desirable to use vitrocrystalline beads rather than glass beads, despite their generally higher cost.

The size of the beads used as filler can have an important effect on the ease with which a filled polymeric matrix can be formed and/or on the eventual properties of that matrix. In the case of moulded plastics materials, it is generally desirable for the beads to have a median diameter of between 20 and 50 micrometers, for example about 44 micrometers. This is because of the effect the presence of the beads has on the flow properties of the polymerisable material during the moulding process. Beads to be used in paints, on the other hand, generally have a median diameter between 50 and 650 micrometers, because this is found to be advantageous for good reflective properties of the filled paint. References to the median bead diameter here and throughout this specification are references to the median diameter by number of beads, that is to say, as many beads have a diameter less than the median as have a diameter greater than the median. In preferred embodiments of the invention therefore, said vitreous beads are selected so that they have a median diameter between 20 and 650 micrometers inclusive.

It will be noted that the smaller the specific surface area of the beads is the smaller the area available for catalyst fixing. In the case of casting or moulding resins, where smaller beads are usually used it may be sufficient to select the size of the beads according to the quantity of catalyst to be supplied to the polymerisable material with which the beads are to be mixed. However, in the case of paints or other resins where beads are applied to the polymerisable material after same has been applied to a surface as a layer, it may be desirable to use relatively large beads, for example with a diameter of between 150 and 650 micrometers, so that the beads can more easily sink into the layer of polymerisable material and entrain the catalyst to the depths of the layer, even though such larger beads have a lower specific surface area, and therefore can carry relatively little catalyst.

Advantageously, at least some of the vitreous beads used have rough surfaces. Such surface roughening can be obtained by a mechanical frosting technique, but in view of the preferred size of the beads it is very much easier to frost them chemically. It is especially preferred, therefore, that at least some of said vitreous beads are treated with an etching medium prior to coating. Such etched beads will have surfaces which are rough and they therefore have greater specific surface areas than smooth beads of the same sizes. Such roughened beads are therefore capable of fixing more catalyst for the same median diameter, and the use of such an etching technique can result in a three-fold increase in the amount of catalyst which can be carried by the beads. This is particularly beneficial when working with rather large beads and/or when rapid polymerisation is required, and/or when it is desired to effect such polymerisation at low ambient temperatures: for example, when laying down pavement markings in winter. It may be noted that beads having roughened surfaces will partially lose the reflective properties for which they have primarily been used in pavement markings. This does not present any real disadvantage, because such beads can be mixed with non-etched catalyst-bearing beads to ensure the desired level of reflectivity from the marking, or with other non-etched beads as will be adverted to below. Indeed it can in some circumstances be a positive advantage, in that such etched beads can be used to replace fillers serving as white pigment such as chalk or titanium dioxide which may be rather more costly.

Such an etching technique is very simply carried out using an etching medium containing fluorine ions, for example, a solution of ammonium bifluoride. Such should only be used however for treating solid beads since hollow beads may have walls too thin to withstand the treatment.

We have referred to the possibility of mixing catalyst-bearing vitreous beads with other beads. In some preferred embodiments of the invention, vitreous beads are coated with a material which renders them both oleophobic and hydrophobic and are incorporated in said filler material together with catalyst-bearing vitreous beads. Such a mixture is particularly well suited for use in pavement marking because the catalyst-bearing beads can be sprinkled onto the wet paint in admixture with the oleophobic and hydrophobic beads using a simple apparatus comprising a paint spray gun and a single bead and catalyst discharge head. The catalyst-bearing beads will sink and mix within the layer of paint while the oleophobic and hydrophobic beads will remain exposed on top of the paint surface where they can reflect light until eroded by traffic movement, at which time the erosion will have exposed some of the catalyst-bearing beads so that they in turn can reflect light.

Advantageously, said catalyst-bearing beads are incorporated in said filler material in a proportion of between 70% and 90% by weight of the total filler. The adoption of this feature has been found particularly beneficial for the rapid formation of retro-reflective coats of polymerised paint.

Indeed, a method according to the invention is particularly suitable for the formation of pavement markings, and in the most preferred embodiments, polymerisable material is applied to a pavement and catalyst-bearing vitreous beads are applied to that polymerisable material to cause in situ polymerisation thereof and the formation of a pavement marking. The expression 'pavement' is used herein in a broad sense, and includes: carriageways, footways, aircraft runways and taxiways, parking zones and other pavement areas. In one very simple and effective method of marking a pavement, a coat of polymerisable paint is deposited on the pavement, and then, while the paint is still wet, vitreous beads to whose surface is fixed a polymerisation catalyst for hardening the paint are sprayed onto the paint. The catalyst bearing beads may be the only beads used, or they may be mixed with other vitreous beads. This method makes it possible to form lines, patterns, letters or other symbols on for example concrete or tarmac surfaces, which markings may be perfectly clear and visible at night in the presence of light from vehicle headlamps. The markings can be applied in a very short time and thus with very little disruption of normal traffic flow. It has been found that by using such a method, savings can be made on the amount of catalyst which must be used as compared with a traditional pavement marking method in which a powder catalyst is applied to the surface of the paint. Moreover, such a method only requires a rather simple apparatus comprising a paint spray gun and a bead discharge device. Such an apparatus can be used for marking by means of a polymerisable paint as well as by means of traditional emulsion paints.

In other preferred embodiments of the invention, a polymerisable material is mixed with catalyst-bearing filler material and the mixture is shaped before hardening thereof by polymerisation. Such a method makes it possible to dose quite precisely the quantity of catalyst required to effect polymerisation of the polymerisable material.

In yet other preferred embodiments of the invention, woven or unwoven glass fibre catalyst-bearing matting is laid up and a polymerisable material is applied thereto. The glass fibre matting may be laid up in a mould or over a stretcher. This is a very simple way of forming a glass fibre reinforced polymeric article. It avoids wastage of the polymeric material due to premature curing of premixed polymerisable material and catalyst, and can ensure a good distribution of catalyst over the whole area of the glass fibre matting.

The invention includes a filled polymeric matrix formed by the method of the invention.

Vitreous filler material bearing a said catalyst is itself a new and useful product, and the present invention extends to vitreous filler material for incorporation into a polymeric matrix, characterised in that a polymerisation catalyst is fixed to the surface of such filler material.

Such a product is especially useful because it is very much easier to mix catalyst-bearing filler material into a polymerisable material with good distribution than it is to mix filler and separate catalyst into the polymerisable material. Thus it is easier to get a rapid and efficient polymerisation of the polymerisable material. The use of vitreous filler material has a number of advantages, in particular vitreous filler materials are inexpensive and widely available, and such material can also be made in a variety of shapes and sizes for conferring particularly desirable properties on filled polymeric material.

Advantageously, said catalyst is adsorbed in a layer of fixing agent adherent to the surface of the filler material. This allows the filler to be stored and handled before contact with a polymerisable material without loss of the catalyst and without reducing the reactivity of the catalyst in relation to the material which is to be polymerised.

As has been mentioned, a number of materials can be used as fixing agent for the catalyst. It is preferred that an organo-metallic compound is used as fixing agent. Many such compounds can easily be caused to bond chemically to the inorganic filler materials, in a monomolecular or multimolecular layer, and they are capable of fixing catalyst to the filler. It is especially preferred that said organo-metallic compound is selected from the group consisting of: silanes, chromium complexes, titanium derivatives and polymers having a methoxysilyl group. Such compounds are especially effective as fixing agents and they also have the advantage that they can promote coupling between the filler material and many common polymeric materials in view such as polyesters and polyacrylates.

There are various polymerisation catalysts which make it possible to harden polymerisable material more quickly and/or at lower temperatures. The use of a peroxide as catalyst is often recommended especially for unsaturated polyesters and copolymers thereof. The invention includes a said filler material wherein a peroxide, for example benzoyl peroxide which is available as a powder which is easy to handle, is fixed to the surface of the filler material as said catalyst.

In some preferred embodiments of the invention, said vitreous filler material comprises glass fibres. Such fibres may be short individual fibres, or they may be long fibres constituting woven or non-woven matting.

In most preferred embodiments of the invention, said filler material comprises vitreous beads. Vitreous beads are particularly useful because their very high degree of spherical symmetry allows especially easy mixing into a fluid or viscoelastic polymerisable material so that the beads and catalyst are well distributed therein, and their use gives good flow properties in any moulding operation and allows a uniform distribution of stresses within the formed polymeric matrix.

If it is desired to manufacture an article of low density, then hollow vitreous beads may be used. However, if it is envisaged that good mechanical resistance in the product will be more important than low density, it is preferred that said vitreous beads comprise solid vitreous beads. For the best mechanical properties in the product it may be desirable to use vitrocrystalline beads rather than glass beads, despite their generally higher cost.

The size of the beads used as filler can have an important effect on the ease with which a filled polymeric matrix can be formed and/or on the eventual properties of that matrix. In the case of moulded plastics materials, it is generally desirable for the beads to have a median diameter of between 20 and 50 micrometers, for example about 44 micrometers. This is because of the effect the presence of the beads has on the flow properties of the polymerisable material during the moulding process. Beads to be used in paints, on the other hand, generally have a median diameter between 50 and 650 micrometers, because this is found to be advantageous for good reflective properties of the filled paint. In preferred embodiments of the invention therefore, said vitreous beads have a median diameter between 20 and 650 micrometers inclusive.

Advantageously, at least some of said vitreous beads have a rough surface bearing said catalyst. Such rough beads will have greater specific surface areas than smooth beads of the same sizes. Such rough beads are therefore capable of fixing more catalyst for the same median diameter, and they can carry up to three times as much catalyst as smooth beads. This is particularly beneficial when working with rather large beads and/or when rapid polymerisation is required, and/or when it is desired to effect such polymerisation at low ambient temperatures. It may be noted that beads having roughened surfaces will partially lose the reflective properties for which they have primarily been used in pavement markings. This does not present any real disadvantage, because such beads can be mixed with smooth catalyst-bearing beads to ensure the desired level of reflectivity from the marking, or with other smooth beads as will be adverted to below. Indeed it can in some circumstances be a positive advantage, in that such rough beads can be used to replace fillers serving as white pigment such as chalk or titanium dioxide which may be rather more costly.

In some preferred embodiments of the invention, said filler material further comprises vitreous beads coated with a material which renders them both oleophobic and hydrophobic. Such a mixture is particularly well suited for use in pavement marking because the catalyst-bearing beads can be sprinkled onto the wet paint in admixture with the oleophobic and hydrophobic beads using a simple apparatus comprising a paint spray gun and a single bead and catalyst discharge head. The catalyst-bearing beads will sink and mix within the layer of paint while the oleophobic and hydrophobic beads will remain exposed on top of the paint surface where they can reflect light until eroded by traffic movement, at which time the erosion will have exposed some of the catalyst-bearing beads so that they in turn can reflect light.

Advantageously, said catalyst-bearing beads are incorporated in said filler material in a proportion of between 70% and 90% by weight of the total filler. The adoption of this feature has been found particularly beneficial for the rapid formation of retro-reflective coats of polymerised paint.

DESCRIPTION OF THE PREFERRED EMBODIMENTS

The present invention will now be described in more detail by means of the examples below.

EXAMPLE 1

Beads are manufactured for introductions into road marking paint. The beads have a diameter of between 150 and 250 micrometers and a median diameter (by number of particles) of 180 micrometers. The paint is an acrylic resin by Röhm, Plexilith SE 663 (Trademark).

Benzoyl peroxide is dissolved in toluene at the rate of 200 g/L solvent. After a few minutes, Union Carbide's silane A 174 is added (gamma-methacryloxypropyl-trimethoxysilane). The solution containing the peroxide catalyst and the silane is poured over the beads while the mixture is kept continually moving. After 15 minutes' agitation, the beads are dried at ambient temperature for 24 hours. The beads carry 0.075 g silane per kilogram and 8 g peroxide per kilogram. This mixture is stored before being taken to the site of road marking.

The paint is sprayed onto the road, and onto the paint are sprayed beads prepared as indicated above at the rate of 1 part beads to 1 part paint (by weight). After 15 minutes, the paint is fully polymerised. The properties of retro-reflection of light exhibited by this paint are no different to those of a paint which is similar but into which the catalyst and bare glass beads have been introduced separately. If the technique according to the prior art is used, in the course of which the catalyst is supplied separately, 2 to 3 times more peroxide is needed to harden the paint in 15 minutes.

In a varient of the present example, 20% of the beads bearing the catalyst were replaced with beads treated by an agent which renders them hydrophobic and oleophobic such as a fluorocarbon agent of the type FC 129 by 3M. Hardening of the paint takes a few minutes longer, but the retro-reflective properties of the paint are improved on account of the presence of the hydrophobic and oleophobic beads at the surface of the hardened coat.

EXAMPLE 2

Example 1 was repeated, but using a mixture of beads of different particle sizes. There is used a mixture consisting of ⅓ solid glass beads with diameters between 40 and 80 micrometers, ⅓ beads with diameters between 75 and 150 micrometers, and ⅓ beads with diameters between 150 and 250 micrometers.

Different quantities of peroxide were deposited on the beads, and in instance the silane A 174 was replaced with an equivalent quantity of a bonding agent with a methoxysilyl group, Polyvest 25 (Trademark) by Hüls.

Table 1 below gives the hardening time of the acrylic paint in the presence of this mixture of beads, for a beads-to-resin ratio of 1:1 by weight.

TABLE 1

| Quantity of peroxide g per kg beads | Polyvest 25 g/kg | A 174 g/kg | Hardening time |
| --- | --- | --- | --- |
| 4 | — | 0.075 | 35 min |
| 8 | — | 0.075 | 15 min |
| 8 | 0.075 | — | 15 min |

EXAMPLE 3

Solid glass beads with a median diameter of 44 micrometers are treated with an aqueous solution of ammonium bifluoride. Beads having undergone this treatment have an opaque white apperance. Their surfaces are rough.

These beads are mixed with a solution of silane A 174 and benzoyl peroxide in toluene. Thus 2 g of silane and 8 g of peroxide per kilogram beads are deposited on the surface of the beads.

A methylacrylic resin of type MDR 824 by I.C.I. containing dimethyl-p-toluidine as accelerator is mixed with 1.25 kg beads per kilogram resin at 20° C. The filled resin is shaped by injection moulding. Hardening of the moulded article after 50 seconds at 70° C. is observed.

EXAMPLE 4

Glass beads of median diameter 44 micrometers are treated in a manner identical to those of example 3, with a glass etching agent and then with a mixture of silane and peroxide. In the present example, the peroxide with which the beads have been impregnated is methylethyl ketone peroxide.

100 parts by weight of these beads are mixed with 100 parts by weight of Epocryl 322 acrylic resin by Shell Chemical Co. and 0.4 parts by weight of cobalt naphthanate as accelerator (6% cobalt). The mixture is poured into a mould at 25° C. The gel time of the mixture is about 10 minutes, and hardening is attained after 20 minutes.

In a variant of this example, to the beads treated as above and bearing the polymerisation catalyst are added glass beads bearing a coating comprising a first substance which, if it were used alone, would render the beads hydrophobic while leaving them oleophilic and a second substance which, if it were used alone, would render the beads hydrophobic and oleophobic (these beads are treated in accordance with the method described in Belgian patent 904,453) so as to obtain good distribution of these beads in the resin and confer reflective properties on the latter. Said mixture is used to mould reflectors.

EXAMPLE 5

Solid glass beads with a median diameter of about 400 micrometers are treated with a mixture of Interox BP-40-S (Trademark) from Peroxide-Chemie GmbH and silane A174. Interox BP-40-S is a 40% suspension of dibenzoyl peroxide in phthalate. This mixture adheres well to the beads and there is no need for any positive drying of the beads after treatment. The phthalate plays the role of plasticiser in the resin. In this way, 0.3 g silane and 2.5 g catalyst per kilogram beads are fixed to the beads.

The treated beads are useful for incorporation in retro-reflective acrylic paints.

EXAMPLE 6

Chopped glass fibers are mixed with a solution of silane A 174 and benzoyl peroxide in toluene and dried. Thus 10 g of silane and about 100 g of peroxide per kilogram fibre are deposited on the surface of the fibres.

A methylacrylic resin of type MDR 806 by I.C.I. containing dimethyl-p-toluidine as accelerator is mixed with 0.20 kg fibre per kilogram resin. The filled resin is shaped by injection moulding. The gel time of the mixture at 20° C. is less than 10 minutes.

EXAMPLE 7

Solid glass beads with a median diameter of about 20 micrometers are mixed with vinyltriethoxysilane A151 (Union Carbide) and Interox BP-40-S (Trademark). This gave fixing to the beads of 0.5 g silane and 2 g of peroxide per kilogram beads. The beads are mixed with a liquid polyester resin, the mixture is immediately applied to a mat of woven glass fibres in a mould, and hardening is observed at ambient temperature.

In a variant, no beads are used. The catalyst is fixed to the surface of the glass fibres.

EXAMPLE 8

In a variant of example 3, the beads have a median diameter of about 40 micrometers and they are not etched. By mixing these beads with a solution of silane A 174 and benzoyl peroxide in toluene, 0.7 g of silane and 2 g of peroxide per kilogram beads are deposited on the surface of the beads.

In another variant, vitrocrystalline beads of the same granulometry are used.

EXAMPLE 9

Mica having a mean particle size of about 25 micrometers is used as filler. By mixing the mica with vinyltriethoxysilane A151 (Union Carbide) and Interox TBPB (Trademark) (t-butyl perbenzoate), 0.5 g of silane and 2.5 g of perbenzoate per kilogram mica are deposited on the surface of the mica. The catalyst-bearing mica is mixed with a polyester resin of the Bulk Moulding Compound type and moulded by injection.

What is claimed is:

1. Vitreous filler material for incorporation into a polymerizable resin, the vitreous filler material consisting essentially of:
   a filler material which is vitreous and has the form of beads;
   a fixing agent which is applied to the surface of the filler material and forms a firm chemical bond thereto; and
   a polymerization catalyst effective for catalyzing polymerization of a polymerizable resin when the vitreous filler material is incorporated therein, which polymerization catalyst is fixed to the filler material by being adsorbed onto the fixing agent to provide catalyst-bearing vitreous beads.

2. The vitreous filler material according to claim 1, wherein the fixing agent is applied to the surface of the filler material as a layer.

3. The vitreous filler material according to claim 1, wherein the fixing agent is an organo-metallic compound.

4. The vitreous filler material according to claim 3, wherein said organo-metallic compound is selected from the group consisting of silanes, chromium complexes, organo-metallic compounds containing titanium, and polymers having a methoxysilyl group.

5. The vitreous filler material according to claim 1, wherein the polymerization catalyst is a peroxide in a phthalate vehicle.

6. The vitreous filler material according to claim 1, wherein the vitreous beads comprise solid beads.

7. The vitreous filler material according to claim 1, wherein said vitreous beads have a medium diameter ranging from 20 to 650 micrometres.

8. The vitreous filler material according to claim 1, wherein at least some of the vitreous beads have a roughened surface which provides these vitreous beads with a specific surface area which is greater than that of vitreous beads which do not have a roughened surface.

9. The vitreous filler material according to claim 1, wherein the filler material further comprises additional vitreous beads which are coated vitreous beads coated with a material which renders them both oleophobic and hydrophobic.

10. The vitreous filler material according to claim 9, wherein the catalyst-bearing vitreous beads are incorporated in the filler material in a proportion of between 70% and 90% by weight of the total filler material.

11. Vitreous filler material for incorporation into a polymerizable resin, the vitreous filler material consisting of:
   a filler material which is vitreous and has the form of beads;
   a fixing agent which is applied to the surface of the filler material and forms a firm chemical bond thereto; and
   a polymerization catalyst effective for catalyzing polymerization of a polymerizable resin when the vitreous filler material is incorporated therein, which polymerization catalyst is fixed to the filler material by the fixing agent to provide catalyst-bearing vitreous beads.

* * * * *